United States Patent
Cobianu et al.

(10) Patent No.: US 7,514,841 B1
(45) Date of Patent: Apr. 7, 2009

(54) GLASS BASED PACKAGING AND ATTACHMENT OF SAW TORQUE SENSOR

(75) Inventors: Cornel Cobianu, Bucharest (RO); Ion Georgescu, Bucharest (RO)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/975,217

(22) Filed: Oct. 18, 2007

(51) Int. Cl.
*H03H 9/25* (2006.01)

(52) U.S. Cl. .................... 310/313 R; 310/340; 29/25.35

(58) Field of Classification Search ............. 310/313 R, 310/340, 344; 29/25.35
See application file for complete search history.

(56) References Cited

U.S. PATENT DOCUMENTS 4,296,347 A * 10/1981 Weirauch ................ 310/313 B
5,059,848 A * 10/1991 Mariani ................... 310/313 R
5,821,595 A * 10/1998 Trimmer et al. ............. 257/417
2006/0088980 A1* 4/2006 Chen et al. ................... 438/460
2007/0126072 A1* 6/2007 Cobianu et al. ............. 257/416
2007/0200146 A1* 8/2007 Onishi et al. ................ 257/202
2007/0296306 A1* 12/2007 Hauser et al. ........... 310/313 R
2008/0168638 A1* 7/2008 Bhattacharjee et al. ..... 29/25.35

* cited by examiner

*Primary Examiner*—Thomas M Dougherty
(74) *Attorney, Agent, or Firm*—Kermit D. Lopez; Luis M. Ortiz

(57) ABSTRACT

A glass cover wafer is bonded to a quartz SAW using glass frit technology, such that the glass wafer and glass frit formulation provides a thermal coefficient of expansion (TCE) of glass that fits the average TCE of the quartz in two perpendicular directions in a unique package. A dicing technology is used for chip separation. The sensor back side and the shaft are attached with a glass glue that transitions the TCE from the shaft to the quartz without interposing a large amount of the glue.

12 Claims, 1 Drawing Sheet

GLASS BASED PACKAGING AND ATTACHMENT OF SAW TORQUE SENSOR

FIELD OF THE INVENTION

The present invention relates to a device for monitoring torque on rotating shafts. More particularly, the present invention relates to a torque monitoring device using a surface acoustic wave (SAW) devices.

BACKGROUND OF THE INVENTION

At the present time, there is an increased need for torque monitoring on rotating shafts in vehicles where improved operation is needed. It is desirable to measure torque for power train and drive line, and then include the sensing result in a closed loop operation for smooth, reliable operation and lower fuel use. In addition, torque monitoring can be of tremendous importance for the structural health monitoring (SHM) of different civil infrastructures and assets such as buildings, bridges, pumps and the like.

Real time monitoring and predictive condition based maintenance practices are another place where torque sensors can be of value. The measurement of torque on moving parts of an engine is, of course, the most challenging process, and involves wireless sensing and detector capability to withstand the automotive industry specifications of a much higher temperature and significant vibration. In the automotive domain, specific materials for sensor realization and the related attachment technology are the key features that need to be addressed. Wireless optical and magnetic principles are frequently used, but the main disadvantages for these remains the high costs of such sensors and the quality of attachment technology specific to the harsh environmental conditions.

In the past two decades, surface acoustic wave (SAW) technology devices have been tried for such torque applications, due to their advantages of passive and wireless operation capabilities in conjunction with low cost that is specific to integrated circuit (IC) like technology for SAW torque sensor fabrication. The SAW sensor is a strain sensitive device and can be wirelessly interrogated from a distance for giving torque information from the position where it is located.

In the prior art, different SAW packaging solutions and attachment technologies have been tried, but they are not passing either the low cost requirement or functional requirement in term of low stress introduced by the package, primarily the technology used to attach the sensor. The strain transmission with high fidelity from the rotating shaft to the sensor is another prerequisite that has not been met. Prior art technologies for SAW packaging and attachment to the substrate have suffered from being labor cost intensive.

Accordingly, one advantage of the present invention is to provide a visionary, low cost and flexible technology that is industrially applicable for SAW torque packaging and attachment to a shaft.

Another advantage of the present invention is to provide a technology that considers the specific requirements of each type of shaft and allow a robust sensor operation in the harsh environment of the automotive industry.

Yet another advantage of this invention is that this technology will be based in IC technology extension at the lever of sensor packaging in terms of wafer level packaging and the use of low cost materials for a package that can be fitted with a piezoelectric substrate in terms of similar thermal expansion coefficients.

Other advantages will appear hereinafter.

SUMMARY OF THE INVENTION

It has now been discovered that the above and other advantages of the present invention may be obtained in the following manner. In its simplest form, the present invention includes a method of mounting a quartz SAW sensor having at least two SAW devices electrically connected to each other on to a shaft. In a preferred embodiment, the present invention further includes a method of packaging the quartz SAW sensor prior to attachment to the shaft or other rotating element.

For the purposes of this invention, the word "shaft" is intended to mean any rotating mechanical element for which a quartz SAW sensor may be used to sense torque.

The back of said quartz SAW sensor is directly attached to a shaft by applying a gel phase of a glass frit composition to a place on said shaft and consolidating the gel phase to a cured glass frit. The glass frit composition should have a thermal coefficient of expansion (hereinafter TCE) bridging the TCE of said shaft and the TCE of said back of said quartz SAW sensor. The back of the quartz SAW sensor is then bonded to the glass frit composition on the shaft.

There are two embodiments for the glass frit composition. First, the glass frit composition has a TCE intermediate of the TCE of the shaft and the TCE of the quartz sensor back. Alternatively, the glass frit composition comprises a first composition applied directly to the shaft and having a TCE near the TCE of the shaft and a second composition is applied to the first composition and having a TCE near the TCE of the quartz sensor back, the quartz sensor back is then applied to the second composition. The first composition of the glass frit is a metal-like glass frit layer formed from a mixture of metal oxide powder and silica powder. The second composition of the glass frit is a silica glass frit having a TCE substantially equal to the average TCE of the quartz sensor back.

The preferred method for packaging the quartz SAW sensor, particularly those having at least two SAW devices, is to place a glass cover wafer having a diameter substantially the same as the quartz SAW sensor, the glass cover wafer in position over the top surface of the sensor. A glass frit paste having a desired pattern is placed on the side of the glass cover wafer facing the sensor to form a pattern of glass frit spacers. The glass frit spacers have a TCE substantially the same as the glass cover wafer. Then the glass cover wafer is aligned over the quartz SAW sensor making direct contact to thereby isolate the glass cover wafer and the SAW sensor by the glass frit spacers. The glass frit spacers further isolate the at least two SAW devices. The glass frit paste is heated at a temperature below the Curie temperature of the quartz SAW sensor to form consolidated solid glass material that seals the surface of the sensor. Finally, the glass cover wafer is sliced to expose the at least two SAW devices for making electrical contact therewith. The sensor is now ready for mounting as described above.

BRIEF DESCRIPTION OF THE DRAWINGS

For a more complete understanding of the invention, reference is hereby made to the drawings, wherein like numbers refer to like elements, and in which.

DETAILED DESCRIPTION OF THE PREFERRED EMBODIMENT

Figure 1:
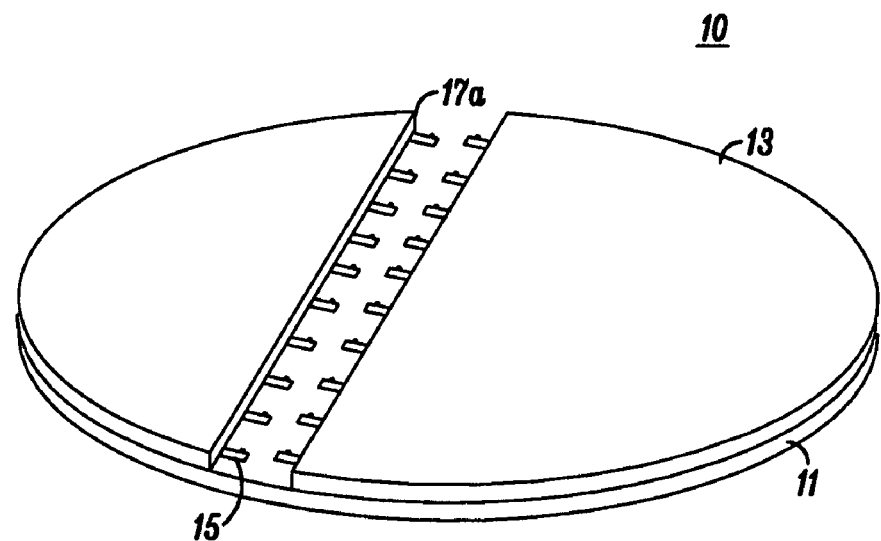
FIG. 1 is a perspective view of a quartz SAW wafer according to the present invention.

The present invention relates to both packaging quartz SAW sensors and attaching quartz SAW sensors to a shaft, as defined above, whether or not the sensor has been packaged according to this invention. FIG. 1 illustrates a perspective view of a sensor device generally 10 having a quartz SAW wafer 11 in which at least two SAW devices as is conventional. It is well known that quartz wafers have different thermal coefficients of expansion (TCE) in different crystalline directions.

A simple, conventional quartz SAW sensor will have two SAW devices electrically connected in parallel (resonator or delay line) located at 45 degrees with respect to an axis normal to the longitudinal axis of a rotating shaft. In the case of SAW resonators based torque sensors, for example, one sensor is exposed to tension stress and its operating frequency is decreasing, while the other sensor is exposed to compression and its operating frequency is increasing. Thus, the frequency difference expresses the temperature compensated torque of the shaft, while the frequency sum indicates the shaft temperature. All of this is known as how quartz SAW sensors function.

In the present invention, such a sensor is packaged in an unique manner. A glass cover wafer 13 with the same diameter as wafer 11 is selected, having a TCE that is suitable as described below. The wafer 11 will include metal 15 for electrical contact. A glass frit paste 17 is deposited on the side of the glass cover wafer 13 facing the quartz wafer 11. The paste 17 may be applied by screen printing through a silk mask or the paste 17 may be directly printed on the glass cover wafer 13. In either case, the glass frit paste is pre-consolidated by heating at around 150° C. to drive off the solvent. The purpose is to create a hermetic package for each SAW chip on the quartz wafer 11. The glass cover wafer 13 is then aligned with the paste 17 on it and makes direct contact of the two wafers so that each SAW chip is isolated from the other by glass frit spacers 17. The glass frit paste will cover the metal paths going outside to the bonding pads, and still maintain the package hermiticity. The inner chamber, not shown, of the device could be filled with dry nitrogen or vacuum. At the appropriate time, gold stud bumps 19 are added.

The bonded wafer as seen in FIG. 1 is thermally annealed at temperatures below the Curie temperature of the quartz substrate so that the glass frit becomes consolidated solid glass material.

Figure 2:
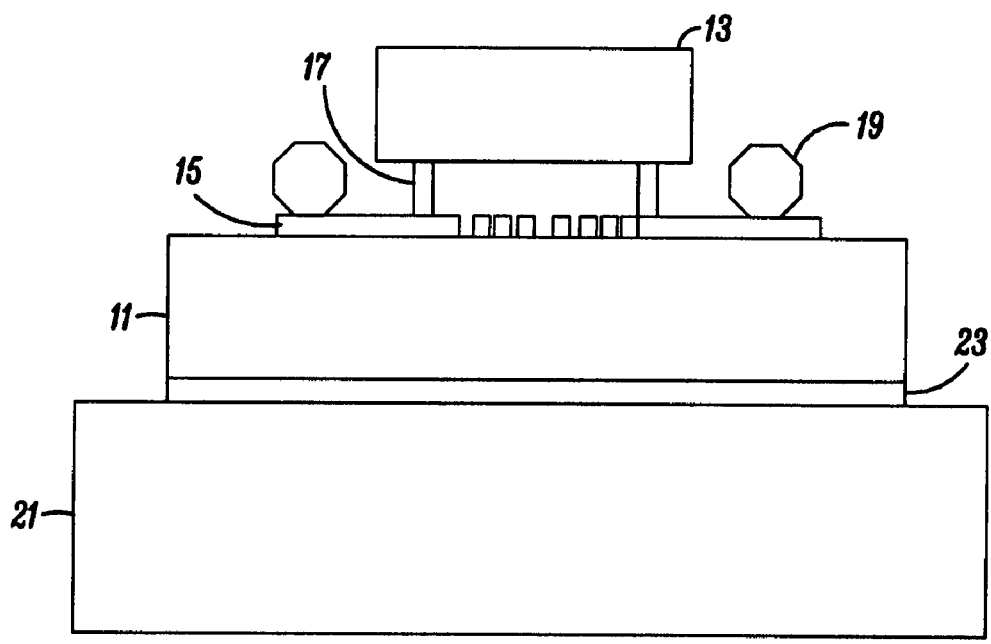
FIG. 2 is a section view of the wafer of FIG. 1 after attachment to a shaft.

The next step is providing electrical access to the SAW chips. The bonded wafers are diced, such as by removing a number of glass strips from the top glass cover wafer 13. For each strip elimination, two cuttings are needed that are in a parallel direction above the bonding pad of neighbor SAW chips. The glass frit spacer 17, as seen in FIG. 2, should be high enough (30 to 50 microns) so as to not allow the disc to touch the metal bonds. Then third and fourth cuts are made perpendicularly on the first two cuttings, so that the glass cover wafer 13 is totally penetrated and the SAW quartz wafer 11 is only partially penetrated. A fifth cut is made through the inner chip between the at least two SAW torque sensor devices without touching the bonding pads. The cut is seen as an open area in FIG. 1 with electrodes 15 exposed and a glass frit wall 17a sealing the metal paths. This is the preferred quartz SAW sensor of the present invention.

The quartz SAW sensor above, or any quartz wafer based SAW sensor is then attaché to a shaft 21 or other rotating mechanical element using a second glass frit layer 23. Layer 23 is relatively thin, not locating the sensor too far from the shaft. The preferred thickness of the second glass frit layer when consolidated into solid glass is about 30 to 50 micrometers.

The surface of the shaft 21 is, of course, cleaned a the location where the sensor is to be attached. A layer of glass frit paste 23 is then deposited on the clean surface. The glass frit paste 23 may comprise a single layer with a TCE equal with the average value between that of the shaft 21 and the quartz 11. The deposition may be done by direct printing. The quartz SAW sensor is then pressed on the shaft and the glass frit paste 23 is cured by thermal annealing of the shaft region where the glass frit paste 23 has been deposited, so that glass frit consolidation occurs, again below the Curie temperature of the quartz substrate. Laser heating or hot air heating are some methods for curing the paste to solid glass.

An alternative way of attaching the sensor to a shaft involves the use of a second glass frit layer 23 that has two components. The glass frit composition 23 comprises a first composition applied directly to said shaft and having a TCE near the TCE of the shaft TCE. A second composition is applied to said first composition that has a TCE near said TCE of said quartz sensor back. Then the quartz sensor back is applied to said second composition to bond it to the shaft.

The first composition of glass frit may be a metal-like glass frit layer formed from a mixture of metal oxide powder and silica powder to give the required TCE. The second composition of said glass frit is a silica glass frit having a TCE substantially equal to the average TCE of the quartz sensor back. Thus a smooth transition between the TCE of the shaft and the sensor is accomplished.

While particular embodiments of the present invention have been illustrated and described, it is not intended to limit the invention, except as defined by the following claims.

The invention claimed is:

1. A method of packaging and mounting a quartz SAW sensor having at least two SAW devices electrically connected to each other on to a shaft, comprising the steps of:
   providing a glass cover wafer having a diameter substantially the same as said quartz SAW sensor;
   adding a glass frit paste having a desired pattern on said glass cover wafer to form a pattern of glass frit spacers and thereafter pre-consolidating said glass frit paste, said glass frit spacers having a TCE substantially the same as said glass cover wafer;
   aligning of said glass cover wafer on said SAW sensor and making direct contact there between to thereby isolate said glass cover wafer and said SAW sensor by said glass frit spacers, said glass frit spacers further isolating said at least two SAW devices;
   consolidating said glass frit paste at a temperature below the Curie temperature of said quartz SAW sensor to form consolidated solid glass material;
   slicing said glass cover wafer to expose said at least two SAW devices for making electrical contact therewith;
   thereafter directly attaching the back of said quartz SAW sensor to a shaft by applying a gel phase of a glass frit composition to a place on said shaft and consolidating said gel phase to a cured glass frit, said glass frit composition having a TCE bridging the TCE of said shaft and the TCE of said back of said quartz SAW sensor; and
   bonding said back of said quartz SAW sensor to said glass frit composition.

2. The method of claim 1, wherein said glass frit composition has a TCE intermediate of the TCE of said shaft and the TCE of said quartz sensor back.

3. The method of claim 1, wherein said glass frit composition when consolidated to a glass is from about 30 to 50 micrometers in thickness and said desired pattern is applied by direct printing.

4. The method of claim 1, wherein said glass frit composition comprises a first composition applied directly to said shaft and having a TCE near said TCE of said shaft and a second composition applied to said first composition and having a TCE near said TCE of said quartz sensor back, said quartz sensor back being applied to said second composition.

5. The method of claim 4, wherein said first composition of said glass frit is a metal-like glass frit layer formed from a mixture of metal oxide powder and silica powder.

6. The method of claim 5, wherein said second composition of said glass frit is a silica glass frit having a TCE substantially equal to the average TCE of said quartz sensor back.

7. A quartz SAW sensor having at least two SAW devices electrically connected to each other in a hermetic package and mounted on to a shaft, comprising:
   a quartz SAW sensor;
   a glass cover wafer having a diameter substantially the same as said quartz SAW sensor;
   a glass frit paste having a desired pattern placed on said glass cover wafer to form a pattern of glass frit spacers, said glass frit spacers having a TCE substantially the same as said glass cover wafer;
   said glass cover wafer being aligned on said SAW sensor and making direct contact there between after first preconditioning said glass frit paste to thereby isolate said glass cover wafer and said SAW sensor by said glass frit spacers, said glass frit spacers further isolating said at least two SAW devices;
   said glass frit paste having been consolidated at a temperature below the Curie temperature of said quartz SAW sensor to form consolidated solid glass material;
   said at least two SAW devices being exposed for making electrical contact therewith;
   the back of said quartz SAW sensor being attached to a shaft by applying a gel phase of a glass frit composition to a place on said shaft and consolidating said gel phase to a cured glass frit, said glass frit composition having a TCE bridging the TCE of said shaft and the TCE of said back of said quartz SAW sensor; and
   said back of said quartz SAW sensor being bonded to said glass frit composition.

8. The device of claim 7, wherein said glass frit composition has a TCE intermediate of the TCE of said shaft and the TCE of said quartz sensor back.

9. The device of claim 7, wherein said glass frit composition when consolidated to a glass is from about 30 to 50 micrometers in thickness.

10. The device of claim 7, wherein said glass frit composition comprises a first composition applied directly to said shaft and having a TCE near said TCE of said shaft and a second composition applied to said first composition and having a TCE near said TCE of said quartz sensor back, said quartz sensor back being applied to said second composition.

11. The device of claim 10, wherein said first composition of said glass frit is a metal-like glass frit layer formed from a mixture of metal oxide powder and silica powder.

12. The device of claim 11, wherein said second composition of said glass frit is a silica glass frit having a TCE substantially equal to the average TCE of said quartz sensor back.

\* \* \* \* \*

UNITED STATES PATENT AND TRADEMARK OFFICE
CERTIFICATE OF CORRECTION

| | |
|---|---|
| PATENT NO. | : 7,514,841 B1 |
| APPLICATION NO. | : 11/975217 |
| DATED | : April 7, 2009 |
| INVENTOR(S) | : Cornel Cobianu et al. |

It is certified that error appears in the above-identified patent and that said Letters Patent is hereby corrected as shown below:

Col. 7 lines 1-15 should read

13. The method of claim 12, wherein said quartz SAW sensor is packaged by the steps including;
providing a glass cover wafer having a diameter substantially the same as said quartz SAW sensor, said glass cover wafer;

adding a glass frit paste having a desired pattern on said glass cover wafer by direct printing to form a pattern of glass frit spacers and thereafter pre-conditioning said paste, said glass frit spacers having a TCE substantially the same as said glass cover wafer;

aligning of said glass cover wafer on said SAW sensor and making direct contact there between to thereby isolate said glass cover wafer and said SAW sensor by said glass frit spacers, said glass frit spacers further isolating said at least two SAW devices;

consolidating said glass frit paste at a temperature below the Curie temperature of said quartz SAW sensor to form consolidated solid glass material; and slicing said glass cover wafer to expose said at least two SAW devices for making electrical contact therewith.

Col. 7 lines 16-33 should read

14. A quartz SAW sensor having at least two SAW devices electrically connected to each other in a hermetic package and mounted on to a shaft, comprising:
a quartz SAW sensor;

a glass cover wafer having a diameter substantially the same as said quartz SAW sensor;

a glass frit paste having a desired pattern placed on said glass cover wafer to form a pattern of glass frit spacers, said glass frit spacers having a TCE substantially the same as said glass cover wafer;

said glass cover wafer being aligned on said SAW sensor and making direct contact there between after first pre-conditioning said glass frit paste to thereby isolate said glass cover wafer and said SAW sensor by said glass frit spacers, said glass frit spacers further isolating said at least two SAW devices;

UNITED STATES PATENT AND TRADEMARK OFFICE
CERTIFICATE OF CORRECTION

PATENT NO. : 7,514,841 B1
APPLICATION NO. : 11/975217
DATED : April 7, 2009
INVENTOR(S) : Cornel Cobianu et al.

It is certified that error appears in the above-identified patent and that said Letters Patent is hereby corrected as shown below:

Cont'd Col.7 lines 16-33 should read said glass frit paste having been consolidated at a temperature below the Curie temperature of said quartz SAW sensor to form consolidated solid glass material;

said at least two SAW devices being exposed for making electrical contact therewith;

the back of said quartz SAW sensor being attached to a shaft by applying a gel phase of a glass frit composition to a place on said shaft and consolidating said gel phase to a cured glass frit, said glass frit composition having a TCE bridging the TCE of said shaft and the TCE of said back of said quartz SAW sensor; and said back of said quartz SAW sensor being bonded to said glass frit composition.

Col. 8 lines 1-2 should read

15. The device of claim 14, wherein said glass frit composition has a TCE intermediate of the TCE of said shaft and the TCE of said quartz sensor back.

Col. 8 lines 3-4 should read

16. The device of claim 14, wherein said glass frit composition when consolidated to a glass is from about 30 to 50 micrometers in thickness.

Col. 8 lines 5-8 should read

17. The device of claim 14, wherein said glass frit composition comprises a first composition applied directly to said shaft and having a TCE near said TCE of said shaft and a second composition applied to said first composition and having a TCE near said TCE of said quartz sensor back, said quartz sensor back being applied to said second composition.

UNITED STATES PATENT AND TRADEMARK OFFICE
CERTIFICATE OF CORRECTION

PATENT NO.         : 7,514,841 B1
APPLICATION NO.    : 11/975217
DATED              : April 7, 2009
INVENTOR(S)        : Cornel Cobianu et al.

It is certified that error appears in the above-identified patent and that said Letters Patent is hereby corrected as shown below:

Col. 8 lines 9-10 should read

18. The device of claim 17, wherein said first composition of said glass frit is a metal-like glass frit layer formed from a mixture of metal oxide powder and silica powder.

Col. 8 lines 11-12 should read

19. The device of claim 18, wherein said second composition of said glass frit is a silica glass frit having a TCE substantially equal to the average TCE of said quartz sensor back.

Signed and Sealed this

First Day of September, 2009

David J. Kappos
*Director of the United States Patent and Trademark Office*